US012769046B2

(12) United States Patent
Yuan et al.

(10) Patent No.: US 12,769,046 B2
(45) Date of Patent: Oct. 20, 2026

(54) OPTICAL SYSTEM AND AIMING DEVICE

(71) Applicant: Nanchang Tripole Optoelectronics CO., Ltd., Jiangxi Province (CN)

(72) Inventors: Junqi Yuan, Nanchang City (CN); Yusheng Ma, Nanchang City (CN)

(73) Assignee: NANCHANG TRIPOLE OPTOELECTRONICS CO., LTD., Nanchang (CN)

( * ) Notice: Subject to any disclaimer, the term of this patent is extended or adjusted under 35 U.S.C. 154(b) by 763 days.

(21) Appl. No.: 17/720,003

(22) Filed: Apr. 13, 2022

(65) Prior Publication Data

US 2022/0342138 A1 Oct. 27, 2022

(30) Foreign Application Priority Data

Apr. 21, 2021 (CN) ........................ 202110416339.X

(51) Int. Cl.
*G02B 6/00* (2006.01)
*F21V 8/00* (2006.01)
(Continued)

(52) U.S. Cl.
CPC ........... *G02B 6/005* (2013.01); *G02B 5/1842* (2013.01); *G02B 5/32* (2013.01); *G02B 6/0023* (2013.01);
(Continued)

(58) Field of Classification Search
CPC ........ G02B 6/005; G02B 5/1842; G02B 5/32; G02B 6/0023; G02B 27/0103;
(Continued)

(56) References Cited

U.S. PATENT DOCUMENTS 4,057,319 A 11/1977 Ash et al.
6,122,079 A * 9/2000 Branca, Jr. ........... G02B 5/0242 359/15

(Continued)

FOREIGN PATENT DOCUMENTS

CA 2336481 A1 11/1999
CA 2451325 A1 2/2003

(Continued)

OTHER PUBLICATIONS

Korean Patent Application No. 10-2022-0044564, Office Action, mailed May 9, 2024.

(Continued)

*Primary Examiner* — Bumsuk Won
*Assistant Examiner* — John C Sipes
(74) *Attorney, Agent, or Firm* — PORUS IP LLC

(57) ABSTRACT

Provided are an optical system and an aiming device. The optical system includes a wavefront modulation element with a first surface and a second surface disposed opposite to each other. The first surface of the wavefront modulation element is configured to receive a first light wave without a complete plane wavefront. The second surface of the wavefront modulation element is configured to emit a second light wave with a complete plane wavefront obtained due to the light beam shaping of the first light wave by the wavefront modulation element. The aiming device includes a housing and the optical system.

19 Claims, 3 Drawing Sheets

(51) Int. Cl.
*G02B 5/18* (2006.01)
*G02B 5/32* (2006.01)
*G02B 27/01* (2006.01)

(52) U.S. Cl.
CPC .. *G02B 27/0103* (2013.01); *G02B 2005/1804* (2013.01)

(58) Field of Classification Search
CPC ........ G02B 2005/1804; G02B 27/0081; G02B 2027/0174; G02B 27/0172; G02B 27/4205; F41G 1/06
See application file for complete search history.

(56) References Cited

U.S. PATENT DOCUMENTS

| | | | | |
|---|---|---|---|---|
| 7,509,048 | B2 | 3/2009 | Turpin et al. | |
| 10,944,904 | B2 * | 3/2021 | Evans | H04N 23/676 |
| 12,189,219 | B2 * | 1/2025 | Hu | G02F 1/0147 |
| 2010/0296163 | A1 | 11/2010 | Saarikko | |
| 2011/0002143 | A1 * | 1/2011 | Saarikko | G02B 6/0016 385/36 |
| 2012/0120469 | A1 | 5/2012 | Fukushima | |
| 2013/0209112 | A1 * | 8/2013 | Witzens | G02B 6/2813 385/14 |
| 2013/0222384 | A1 | 8/2013 | Futterer | |
| 2014/0178861 | A1 | 6/2014 | Duer | |
| 2015/0268399 | A1 * | 9/2015 | Futterer | G02B 6/0076 362/606 |
| 2018/0101015 | A1 * | 4/2018 | Hu | G02B 27/0927 |
| 2018/0299678 | A1 | 10/2018 | Singer et al. | |
| 2019/0094803 | A1 | 3/2019 | Futterer | |
| 2019/0145734 | A1 | 5/2019 | Morell | |
| 2020/0064633 | A1 | 2/2020 | Maimone | |
| 2020/0271928 | A1 * | 8/2020 | Schwartze | B60R 1/001 |
| 2020/0333534 | A1 | 10/2020 | Cotton | |
| 2021/0223461 | A1 * | 7/2021 | Ma | G02B 27/0172 |
| 2021/0382351 | A1 * | 12/2021 | Wang | G02F 1/13306 |
| 2022/0137408 | A1 * | 5/2022 | Bohn | G02B 5/1819 345/8 |
| 2022/0206295 | A1 * | 6/2022 | Calafiore | G02B 27/0101 |
| 2022/0244592 | A1 * | 8/2022 | Jang | G02F 1/133531 |
| 2022/0269075 | A1 * | 8/2022 | Yang | G02B 27/0103 |
| 2023/0069985 | A1 * | 3/2023 | Sung | B23K 26/0622 |
| 2024/0295702 | A1 * | 9/2024 | Luetz | G03B 17/17 |

FOREIGN PATENT DOCUMENTS

| | | | |
|---|---|---|---|
| CN | 101614876 | B | 9/2011 |
| CN | 103838123 | A | 6/2014 |
| CN | 104375271 | A | 2/2015 |
| CN | 105137598 | A | 12/2015 |
| CN | 105917277 | A | 8/2016 |
| CN | 105929560 | A | 9/2016 |
| CN | 107703571 | A | 2/2018 |
| CN | 107748407 | A | 3/2018 |
| CN | 108803023 | A | 11/2018 |
| CN | 208139945 | U | 11/2018 |
| CN | 109888491 | A | 6/2019 |
| CN | 109901298 | A | 6/2019 |
| CN | 110244463 | A | 9/2019 |
| CN | 110488490 | A | 11/2019 |
| CN | 110503019 | A | 11/2019 |
| CN | 110524875 | A | 12/2019 |
| CN | 110579876 | A | 12/2019 |
| CN | 111175971 | A | 5/2020 |
| CN | 211348864 | U | 8/2020 |
| CN | 111649623 | A | 9/2020 |
| CN | 112904585 | A | 6/2021 |
| CN | 215006082 | U | 12/2021 |
| GB | 2569208 | A | 6/2019 |
| JP | H06222300 | A | 8/1994 |
| JP | 2001121282 | A | 5/2001 |
| JP | 2002049002 | A | 2/2002 |
| JP | 2011501212 | A | 1/2011 |
| JP | 2014186292 | A | 10/2014 |
| JP | 2014224977 | A | 12/2014 |
| KR | 20190008311 | A | 1/2019 |
| KR | 20200105670 | A | 9/2020 |
| TW | 201617679 | A | 5/2016 |
| WO | 9000270 | A2 | 1/1990 |
| WO | 2012004016 | A1 | 1/2012 |
| WO | 2020009788 | A1 | 1/2020 |
| WO | 2020106340 | A2 | 5/2020 |
| WO | 2020162258 | A1 | 8/2020 |

OTHER PUBLICATIONS

The State Intellectual Property Office of People's Republic of China, Office Action, Application No. 202110416339, mailed May 26, 2022.
European Patent Office, European Search Report, Jan. 24, 2023, International Application No. 22166459.
China National Intellectual Property Administration, International Search Report, Jan. 28, 2022, International Application No. PCT/CN2021/109950.
Liu, Ao, Study on the Mechanism and Key Technology of the Colorful Holographic Waveguide Display, Chinese Doctoral Dissertations Full-Text Database, No. 1, Jan. 15, 2021, ISSN: 1674-022X.
Japanese Patent Application No. 2022-063929, Office Action, mailed Apr. 10, 2023.
Notice of Reasons for Rejection in Korean Application No. 10-2022-0044564 mailed on Aug. 5, 2024, 11 pages.
Chang, Chenliang et al., Computational Holographic Maxwellian Near-eye Display with An Expanded Eyebox, Scientific Reports, 2019, 9 pages.
Munkh-Uchral Erdenebat et al., Waveguide-Type Head-Mounted Display System for AR Application, IntechOpen, 41-58, 2018.
Cheng, Xin, Study on Holographic Waveguide Technology for Helmet Display System, A Dissertation Submitted for the Degree of Master of Hefei University of Technology, 2018, 61 pages.
A. E. Ash et al., Efficient Coupling of A Laser to A Waveguide Using A Taper Designed by Conformal Mapping, Optical and Quantum Electronics, 32: 197-208, 2000.
Svetlana Khasminskaya et al., Waveguide-Integrated Light-Emitting Carbon Nanotubes, Advanced Materials, 26: 3465-3472, 2014.
Li, Tao et al., Manipulating Surface Plasmon Propagation: From Beam Modulation to Near-Field Holography, Laser & Optoelectronics Progress, 2017, 24 pages.

* cited by examiner

OPTICAL SYSTEM AND AIMING DEVICE

CROSS-REFERENCE TO RELATED APPLICATIONS

This application claims priority to Chinese patent application No. 202110416339.X filed with the China National Intellectual Property Administration (CNIPA) on Apr. 21, 2021, the disclosure of which is incorporated herein by reference in its entirety.

TECHNICAL FIELD

The present disclosure relates to the field of optoelectronic technology and, in particular, to an optical system and an aiming device.

BACKGROUND

An optical system composed of a waveguide bearing an incidence grating and an emission grating has been applied to many fields. In such an optical system, a light ray is incident onto the waveguide through the incident grating, the light ray incident onto the waveguide is parallel light, the parallel light propagates in the waveguide; and when the parallel light propagates to the emission grating, the parallel light is coupled out of the waveguide. In the case where the light ray coupled out of the waveguide does not have a complete plane wave, the image quality is not high.

SUMMARY

Embodiments of the present application provide an optical system and an aiming device. The system includes a wavefront modulation element with a first surface and a second surface disposed opposite to each other. The first surface of the wavefront modulation element is configured to receive a first light wave without a complete plane wavefront. The second surface of the wavefront modulation element is configured to emit a second light wave with a complete plane wavefront obtained due to the light beam shaping of a non-complete plane wavefront by the wavefront modulation element. The aiming device includes a housing and the optical system described above, and the optical system is disposed in the housing.

The object and feature of the present disclosure is, to some extent, set forth in the description below, and is, to some extent, apparent to those skilled in the art based on the investigation and research below, or may be taught from the practice of the present disclosure. The object and other advantages of the present disclosure can be achieved and obtained through the structures especially indicated in the description, claims and drawings.

BRIEF DESCRIPTION OF DRAWINGS

The drawings are used to provide a further understanding of the scheme of the present application or the related art, and form a part of the description. The drawings illustrating embodiments of the present application, together with the embodiments of the present application, are used to explain the solution of the present application, but do not constitute a limitation of the solution of the present application.

DETAILED DESCRIPTION

The implementation of the present disclosure is described hereinafter in detail with reference to the drawings and embodiments, so as to fully understand and implement the implementation process of how the present disclosure applies the technical method to solve the technical problem and achieve the corresponding technical effect. In the case where there is no collision, the embodiments of the present application and features therein may be combined with each other and the formed scheme falls within the scope of the present application.

Figure 1:
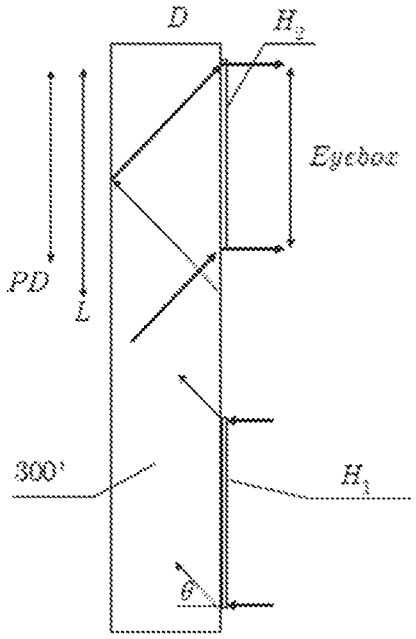
FIG. 1 is a view illustrating the structure of an optical system.

Referring to FIG. 1, H1 denotes a coupling input grating, H2 denotes a coupling output grating, and the coupling output grating H2 has a target image. The coupling input grating H1 and the coupling output grating H2 fit against the same surface of a waveguide 300'. The coupling input grating H1, the coupling output grating H2 and the waveguide 300' constitute an optical system. Parallel light is incident onto the coupling input grating H1 and coupled into the waveguide 300' by the coupling input grating H1. The parallel light is transmitted in the waveguide in a total reflection manner. When the parallel light reaches the coupling output grating H2, the coupling output grating H2 couples the parallel light out of the waveguide 300' and emits the parallel light to human eyes. The range of the parallel light emitted from the coupling output grating H2 is called eyebox. The light beam width PD of the incident parallel light is consistent with the light beam width PD of the emission parallel light. The transmission angle of the light ray in the waveguide 300' is $\theta$. The total reflection cycle of the light ray transmitted in the waveguide 300' is $L=2D \tan \theta$, where D denotes the thickness of the waveguide 300'.

The preceding optical system may be applied to a waveguide holographic aiming device. The light ray input from the waveguide 300' to the surface of the coupling output grating H2 needs to have a plane wavefront, and at this time, the coupling output grating H2 may clearly diffract the target image without distortion in a far-field (because a plane wave is used for recording). The plane wavefront represents that the phase distribution of a light wave is a linear distribution. Generally, a relatively large eyebox dimension is required for human eye observation, for example, 25 mm*25 mm. In order to ensure the plane wavefront, it is required that the coupling input grating H1 on the waveguide 300' is as large as the coupling output grating H2, that is, 25 mm*25 mm; the light beam width PD of the parallel light propagated in the waveguide 300' has the same caliber on the surface of the coupling input grating H1 and the surface of the coupling output grating H2; and the total reflection cycle L of transmission is larger than or equal to the light beam width PD of the incident parallel light. The total reflection cycle L of transmission is related to the thickness D of the waveguide 300'. If the transmission angle $\theta$ in the waveguide 300' does not change, the thickness D of the waveguide 300' is also required to be thicker to ensure the plane wavefront. These factors lead to the need to increase the transverse dimension or the longitudinal dimension of each element in the optical system in order to obtain sufficiently good target image quality and sufficient eyebox, which undoubtedly leads to the disadvantage of a large volume of the optical system. If the plane wavefront cannot be guaranteed, the final obtained target image may be distorted and blurred. As a result, the effect of final aiming is affected.

In order to provide a new scheme that can reduce the dimensional constraint of each element in the optical system, solve the preceding problems in the waveguide aiming device, and ensure that the target image quality is not reduced at the same time, this embodiment of the present application provides an optical system. The system includes a wavefront modulation element 500 with a first surface and a second surface disposed opposite to each other. The first surface of the wavefront modulation element 500 is configured to receive a first light wave without a complete plane wavefront. The second surface of the wavefront modulation element 500 is configured to emit a second light wave with a complete plane wavefront obtained due to the light beam shaping of the first light wave by the wavefront modulation element 500.

The wavefront modulation element 500 performs the light beam shaping on the first light wave without the complete plane wavefront. The second light wave may be obtained by the light beam shaping of the amplitude and the phase of the first light wave. The second light wave has the complete plane wavefront. The second light wave emitted from the second surface of the wavefront modulation element 500 may be used to irradiate a layer element 600 (Fourier hologram). The layer element 600 is configured to receive the second light wave and present a target image recorded by the layer element 600. The layer element 600 can present the target image with high quality. Since the wavefront modulation element 500 may modulate the first light wave without the complete plane wavefront into the second light wave with the complete plane wavefront, the wavefront modulation element 500 may be used for cooperating with the optical system that emits the first light wave without the complete plane wavefront. Moreover, the dimensions of the optical system that emits the first light wave without the complete plane wavefront are not limited by a transverse dimension or a longitudinal dimension, and the volume of such an optical system can be more compact.

In some embodiments, the first light wave includes a plurality of segmented plane waves. At least two adjacent plane waves of the plurality of segmented plane waves partially overlap. The segmented plane wave does not have the complete plane wavefront. For example, the optical system shown in FIG. 2 includes a waveguide 300, and a coupling input grating 401 and a coupling output grating 402 fitted on the same surface of the waveguide 300. Parallel light is incident onto the coupling input grating 401 and coupled into the waveguide 300 by the coupling input grating 401. The parallel light is transmitted in the waveguide 300 in a total reflection manner. When the parallel light reaches the coupling output grating 402, the coupling output grating 402 couples the parallel light out of the waveguide 300 and emits the parallel light to human eyes. The range of the parallel light emitted from the coupling output grating 402 is called eyebox. The light beam width PD of the incident parallel light may be greater than the total reflection cycle $L=2D\tan\theta$ of the light ray transmitted in the waveguide 300. The transmission angle of the light ray in the waveguide 300 is θ. D denotes the thickness of the waveguide 300. The first light wave emitted by the coupling output grating 402 includes a first segmented plane wave (1st) and a second segmented plane wave (2nd). The first segmented plane wave overlaps with the second segmented plane wave. The light beam complex amplitude field of the first light wave includes the sum of the two segmented plane waves. Each segmented plane wave field has a total wave field with a different amplitude and a different phase.

The first segmented plane wave has a plane wavefront $W_1(x)=A_1(x)\exp[i\varphi_1(x)]$, where $A_1(x)$ denotes the amplitude distribution of the first segmented plane wave at position x, and $□_1(x)$ denotes the phase distribution of the first segmented plane wave at position x. The second segmented plane wave has a plane wavefront $W_2(x)=A_2(x)\exp[i\varphi_2(x)]$, where $A_2(x)$ denotes the amplitude distribution of the second segmented plane wave at position x, and $□_2(x)$ denotes the phase distribution of the second segmented plane wave at position x. The wavefront of the first light wave is $W(x)=W_1(x)+W_2(x)=A(x)\exp[i\varphi(x)]$, where A(x) denotes the amplitude distribution of the first light wave at position x, and □(x) denotes the phase distribution of the first light wave at position x. Through the light beam shaping of the amplitude and the phase of the first light wave, the wavefront modulation element 500 may modulate the first light wave without the complete plane wavefront into the second light wave with the complete plane wavefront.

In some embodiments, in order to increase use comfort, the dimensions of the eyebox may be increased. For example, a light beam is extended multiple times in the waveguide 300. The first light wave does not have the complete plane wavefront. The first light wave is $W(x)=\Sigma W_n(x)=A(x)\exp[i\varphi(x)]$, where $W_n(x)$ denotes the light wave of the $n^{th}$ segment at position x, A(x) denotes the amplitude distribution of the first light wave at position x, and □(x) denotes the phase distribution of the first light wave at position x. In order to make the second light wave emitted by the second surface of the wavefront modulation element 500 has the plane wavefront, the second light wave is $V(x)=\alpha\exp[i\beta(x)]$, where □ denotes a constant, and □(x) denotes a proportional function. The wavefront modulation element 500 has a complex amplitude transmittance $T(x)=t(x)\exp[i\phi(x)]$, where t(x) denotes the amplitude transmittance distribution of the wavefront modulation element 500 and $$t(x)=\frac{\alpha}{A(x)},$$

and ϕ(x) denotes the phase distribution of the wavefront modulation element 500 and $\phi(x)=\beta(x)+2m\pi-\varphi(x)$, where m denotes an integer.

The second light wave emitted by the second surface of the wavefront modulation element 500 is $V(x)=W(x)T(x)$. In order to ensure that the emitted second light wave is a plane wavefront, the amplitude of V(x) is required to be a constant, and the phase of V(x) is required to be a linear phase, that is, $$\begin{aligned}V(x)&=A(x)\exp[i\varphi(x)]t(x)\exp[i\phi(x)]\\&=a\exp[i\beta(x)]\end{aligned},$$

where □ denotes a constant, and □(x) denotes a proportional function. For example, $\beta(x)=k\sin(\gamma)x$, where k denotes a wavenumber, and □ denotes the incident angle to the layer element 600, and when normal incidence occurs, γ=0. □(x) denotes the wavefront phase distribution of the recording light of the layer element 600. The wavefront modulation element 500 achieves modulation with complex amplitude transmittance T(x)=t(x)exp[iϕ(x)] at each position x, where t(x) denotes the amplitude transmittance of the wavefront modulation element 500 and $$t(x) = \frac{\alpha}{A(x)};$$

and ϕ(x) denotes the phase distribution of the wavefront modulation element 500 and ϕ(x)=β(x)+2mπ−φ(x), where m denotes a phase design degree of freedom, and the phase design degree of freedom does not affect the effect of phase adjustment.

In some embodiments, the layer element 600 receives the second light wave and presents the target image recorded by the layer element 600. The layer element 600 (Fourier hologram) may record the image by using the plane wavefront. The plane wave is selected when the Fourier hologram is recorded. On the one hand, the plane wave is easy to obtain. On the other hand, the plane wavefront may be attached with a constant phase. Therefore, in actual use, only the angle incident to the hologram needs to be correct. The second light wave V(x) modulated and emitted by the wavefront modulation element 500 is the plane wavefront. When the second light wave is irradiated onto the layer element 600, the Fourier spectrum light U(x) of the object may be obtained. The layer element 600 records the wavefront phase distribution □(x) of the light, so that the human eyes may observe the intensity distribution O(u) of the target image, that is, $O(u)=|FT\{U(x)\}|^2$, where FT denotes a Fourier transform process, and || denotes the modulo operation.

In some embodiments, the wavefront modulation element 500 may be processed by a holographic manufacturing process. The holographic manufacturing process is configured to make the wavefront modulation element 500 have the complex amplitude transmittance T(x)=t(x)exp[iϕ(x)].

Figure 3:
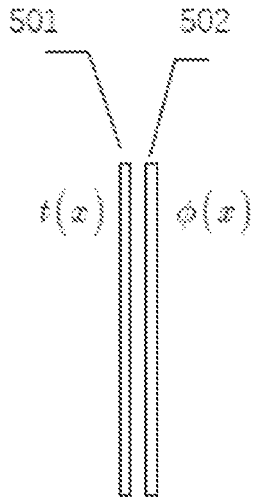
FIG. 3 is a view illustrating the structure of a wavefront modulation element according to an embodiment of the present application.

In some embodiments, referring to FIG. 3, the wavefront modulation element 500 includes a first optical element 501 and a second optical element 502. The first optical element 501 has an amplitude transmission distribution $$t(x) = \frac{\alpha}{A(x)}.$$

The second optical element 502 has a phase distribution ϕ(x)=β(x)+2mπ−φ(x). The wavefront modulation element 500 may modulate the amplitude and the phase separately through two optical elements. The first optical element 501 and the second optical element 502 may be manufactured by the holographic manufacturing process.

In some embodiments, the first optical element 501 fits against the second optical element 502. The first surface is located on the side of the first optical element 501 facing away from the second optical element 502 or on the side of the second optical element 502 facing away from the first optical element 501. The second surface is located on the side of the second optical element 502 facing away from the first optical element 501 or on the side of the first optical element 501 facing away from the second optical element 502. The first optical element 501 is configured to modulate the amplitude. The second optical element 502 is configured to modulate the phase. The first light wave may first enter the second optical element 502 for phase modulation, and then enter the first optical element 501 for amplitude modulation to obtain the second light wave. Alternatively, the first light wave may first enter the first optical element 501 for amplitude modulation, and then enter the second optical element 502 for phase modulation to obtain the second light wave.

Figure 4:
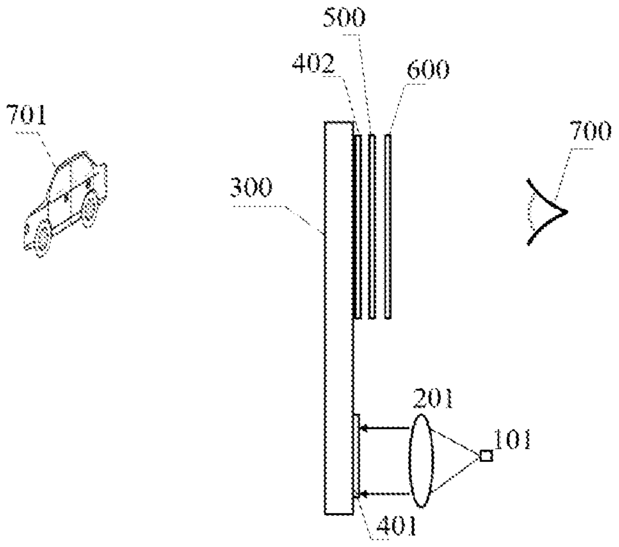
FIG. 4 is a view illustrating the structure of an optical system according to an embodiment of the present application.
Figure 5:
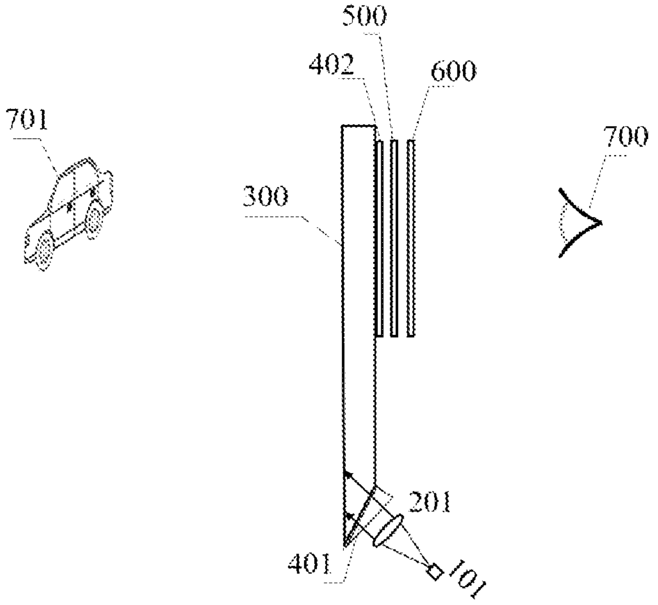
FIG. 5 is a view illustrating the structure of an optical system according to another embodiment of the present application.
Figure 6:
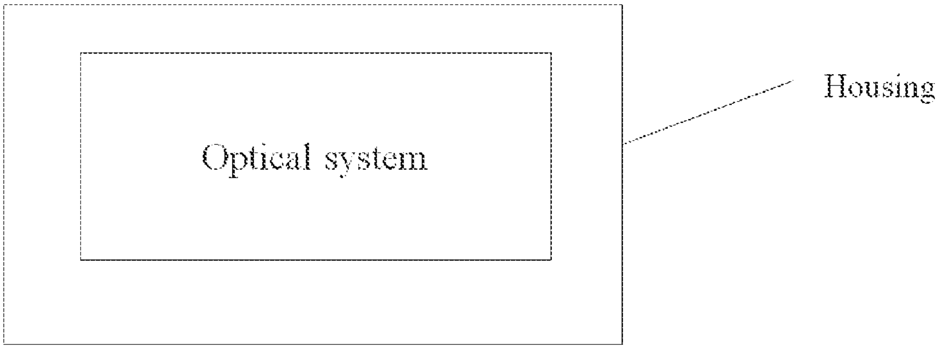
FIG. 6 is a view illustrating the structure of an aiming device according to an embodiment of the present application.

In some embodiments, referring to FIGS. 4 and 5, the optical system includes the wavefront modulation element 500, a light source 101, a coupling input element 401, a waveguide 300, a coupling output grating 402, and a layer element 600. The light source 101 is configured to emit the light ray. The coupling input element 401 is configured to receive the light ray emitted by the light source 101 and refract the light ray. The waveguide 300 is configured to receive the light ray refracted by the coupling input element 401 and propagate the light ray in the waveguide 300 in a manner greater than a total reflection angle. The coupling output grating 402 is configured to couple, out of the waveguide, the light ray propagated in the waveguide 300. The light ray emitted from the waveguide 300 is the first light wave. The layer element 600 is configured to receive the second light wave and present the target image recorded by the layer element 600. The first light wave is modulated by the wavefront modulation element 500 to form the second light wave. The second light wave irradiates onto the layer element 600. The target image enters the human eyes 700. The human eyes 700 may see a clear and undistorted target image 701.

Figure 2:
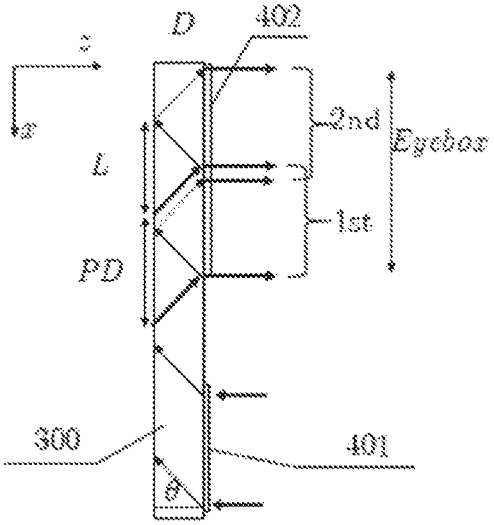
FIG. 2 is a view illustrating the structure of another optical system.

The coupling input element 401 refracts the light ray emitted by the light source 101 into the parallel light and the parallel light is incident onto the waveguide 300. The parallel light propagates in the waveguide 300 until the parallel light meets the coupling output grating 402, and then the coupling output grating 402 couples the parallel light out of the waveguide 300. The first light wave emitted by the coupling output grating 402 may not have the complete plane wavefront. Therefore, the light beam dimensions of the coupling input element 401 and the light beam dimensions of the coupling output grating 402 do not need to be the same. The caliber of the surface light beam of the coupling output grating 402 may be much larger than the input caliber of the surface light beam of the coupling input element 401. The total reflection cycle L of the light ray transmitted in the waveguide 300 may be smaller than the width PD of the incident light beam. Referring to FIG. 2, light beams that hit the coupling output grating 402 twice may overlap. Finally, the light ray emitted from the surface of the coupling output grating 402 does not have the complete plane wavefront (but is segmented). In this manner, the dimensions of each element of the optical system can be reduced, and the overall volume of the optical system can be more compact. For example, the dimensions of the coupling input element 401, the thickness of the waveguide 300, and the volume of a collimation system that often generates input light can be effectively reduced, and the quality of the image emitted by the layer element 600 can also be guaranteed.

The coupling input element 401 and the coupling output grating 402 are each disposed in parallel with at least one plane of the waveguide 300. For example, when the coupling input element 401 is a coupling input grating, the coupling input grating and the coupling output grating 402 are disposed in parallel with two opposite planes of the waveguide 300, respectively, alternatively, the coupling input grating and the coupling output grating 402 are each disposed in parallel with one plane of the waveguide 300. The coupling input element 401 and the coupling output grating 402 fit against the waveguide 300. For example, when the coupling input element 401 is a coupling input grating, the coupling input grating and the coupling output grating 402 may be fitted on one surface of the waveguide 300 (referring to FIG. 4), or the coupling input grating and the coupling output grating 402 may also fit against two surfaces of the waveguide 300, respectively. The coupling input grating and the coupling output grating 402 may be fitted on the surface of the waveguide 300 facing the human eyes 700, or the coupling input grating and the coupling output grating 402 may also be fitted on the surface of the waveguide 300 facing away from the human eyes 700.

The wavefront modulation element 500 and the layer element 600 are disposed on the side facing the human eyes 700. The wavefront modulation element 500 is disposed in parallel with the layer element 600. The wavefront modulation element 500 is disposed in parallel with the coupling output grating 402. If the coupling output grating 402 is disposed on the side of the waveguide 300 facing the human eyes 700, the first surface of the wavefront modulation element 500 may be fitted on the coupling output grating 402. The coupling output grating 402 may be disposed on the side of the waveguide 300 facing away from the human eyes 700. The first surface of the wavefront modulation element 500 may have a predetermined interval with the waveguide 300.

The waveguide 300 may be made of transparent optical plastic or glass material and has a refractive index n. The transmission angle θ of the light ray in the waveguide 300 meets $n \sin(\theta) \geq 1$. The light ray may propagate in the waveguide 300 in a total reflection manner. The coupling output grating 402, the wavefront modulation component 500 and the layer element 600 may transmit ambient light. The human eyes 700 can see the actual ambient light through the waveguide 300, the coupling output grating 402, the wavefront modulation element 500 and the layer element 600.

In some embodiments, the second surface of the wavefront modulation element 500 fits against the layer element 600. The second surface of the wavefront modulation element 500 emits the second light wave. The second light wave has the complete plane wavefront. The second light wave is irradiated to the layer element 600. The human eyes 700 can see the target image recorded by the layer element 600.

In some embodiments, referring to FIG. 4, the light source 101 may be a point light source. The point light source 101 emits monochromatic light into the coupling input grating, and the monochromatic light is refracted by the coupling input grating and enters the waveguide 300 to obtain the parallel light transmitted in the waveguide 300.

In some embodiments, the optical system further includes a collimation element 201. The collimation element 201 is disposed in the optical path between the light source 101 and the coupling input element 401. The collimation element 201 is configured to collimate the light ray emitted by the light source 101 and emit the collimated light ray towards the coupling input element 401. The collimation element 201 may collimate the light ray emitted by the point light source 101 into the parallel light. The coupling input grating refracts the parallel light into the waveguide 300.

In some embodiments, referring to FIG. 5, the coupling input element 401 included in the optical system may be a coupling input prism. The coupling input prism refracts the light ray emitted by the light source 101 into the waveguide 300. The coupling input prism may fit with one side of the waveguide 300, and the coupling output grating 402 fits with the other side of the waveguide 300. The two sides are not parallel. In addition, the optical system may also include a collimation element 201. The collimation element 201 is disposed in the optical path between the light source 101 and the coupling input prism. The collimation element 201 is configured to collimate the light ray emitted by the light source 101 and emit the collimated light ray towards the coupling input prism. The coupling input prism refracts the collimated light ray into the waveguide 300. The collimation element 201 and the light source 101 each may be disposed at a position facing the side of the waveguide. The coupling input prism replaces the coupling input grating to improve the light energy utilization rate.

In some embodiments, the length at which the coupling output grating 402 fits against the waveguide 300 is greater than the length at which the coupling input element 401 fits against the waveguide 300. The dimensions of the optical system can be reduced, but the image quality is not reduced. The human eyes 700 may see a clear and undistorted target image.

In the preceding optical system, the manner in which the layer element 600 presents an aiming image (target image) may be used for a holographic aiming device. The holographic aiming device includes a housing and the preceding optical system. The optical system is disposed in the housing. Such holographic aiming device can take advantage of optical-path refraction through a holographic waveguide and easy integration of a grating to reduce the volume of the holographic aiming device, remove the limitation on components in traditional waveguide aiming, and avoid reducing the image quality.

The above are merely preferred implementations of the present disclosure and are not intended to limit the scope of the present disclosure. It is easy for those skilled in the art to conceive modifications or substitutions within the technical scope of the present disclosure. These modifications or substitutions are within the scope of the present disclosure. Therefore, the scope of the present disclosure is subject to the scope of the claims.

The invention claimed is:

1. An optical system, comprising:

a light source for emitting a light ray;

a coupling input element for receiving the light ray emitted by the light source and refracting the light ray;

a waveguide for receiving the light ray refracted by the coupling input element and propagating the light ray in the waveguide in a manner greater than a total reflection angle, wherein a total reflection cycle of the light ray transmitted in the waveguide is smaller than a width of an incident light beam;

a coupling output grating for coupling, out of the waveguide, the light ray propagated in the waveguide, wherein a light ray emitted from the waveguide is a first light wave;

a wavefront modulation element with a first surface and a second surface disposed opposite to each other, wherein the first surface of the wavefront modulation element is configured to receive the first light wave without a complete plane wavefront, and the second surface of the wavefront modulation element is configured to emit a second light wave with a complete plane wavefront obtained due to light beam shaping of the first light wave by the wavefront modulation element, wherein the first light wave comprises a plurality of segmented plane waves, and at least two adjacent plane waves of the plurality of segmented plane waves partially overlap, each of the plurality of segmented plane waves has a total wave field with a different amplitude and a different phase, and the plurality of segmented plane waves are formed by a superposition of two light beams hitting the coupling output grating; and a layer element for receiving the second light wave and presenting a target image recorded by the layer element, wherein the layer element includes a Fourier hologram, the layer element is further configured to convert a Fourier spectrum light U(x) into an intensity distribution O(u) of an image observable to human eyes, a conversion formula of the conversion is as follows:

$$O(u)=|FT\{U(x)\}|^2,$$

wherein FT denotes a Fourier transform process, and || denotes the modulo operation;

the coupling input element and the coupling output grating fit against the waveguide, the wavefront modulation element comprises a first optical element configured to modulate amplitude and a second optical element configured to modulate phase, the first optical element has an amplitude transmission distribution $$t(x) = \frac{\alpha}{A(x)},$$

α denotes a constant, and A(x) denotes an amplitude distribution of the first light wave at position x, the second optical element has a phase distribution φ(x) =β(x)+2mπ−ϕ(x), m is an integer, β(x) denotes a proportional function, and ϕ(x) denotes a phase distribution of the first light wave at position x, the β(x) satisfies a formula β(x)=k sin(γ)x, where k denotes a wavenumber of the first light wave, and γ denotes an incident angle to the layer element.

2. The optical system according to claim 1, wherein the first light wave is $W(x)=\Sigma W_n(x)=A(x)\exp[i\varphi(x)]$ wherein $W_n(x)$ denotes a light wave of an $n^{th}$ segment at position x, A (x) denotes the amplitude distribution of the first light wave at position x, and ϕ(x) denotes the phase distribution of the first light wave at position x; the second light wave is V(x)=α exp [iβ(x)], wherein α denotes the constant, and β(x) denotes the proportional function; and the wavefront modulation element has a complex amplitude transmittance T(x)=t(x)exp[iφ(x)].

3. The optical system according to claim 2, wherein the wavefront modulation element is processed by a holographic manufacturing process.

4. The optical system according to claim 1, wherein the first optical element fits against the second optical element, the first surface is located on a side of the first optical element facing away from the second optical element, the second surface is located on a side of the second optical element facing away from the first optical element.

5. The optical system according to claim 1, wherein the first optical element fits against the second optical element, the first surface is located on a side of the second optical element facing away from the first optical element, the second surface is located on a side of the first optical element facing away from the second optical element.

6. The optical system according to claim 1, wherein light beam dimensions of the coupling input element are different from light beam dimensions of the coupling output grating.

7. The optical system according to claim 1, wherein the coupling input element and the coupling output grating are each disposed in parallel with at least one plane of the waveguide.

8. The optical system according to claim 1, wherein the wavefront modulation element and the layer element are disposed on a side facing human eyes, the wavefront modulation element is disposed in parallel with the layer element, and the wavefront modulation element is disposed in parallel with the coupling output grating.

9. The optical system according to claim 1, wherein the coupling input element is a coupling input grating or a coupling input prism; and the optical system further comprises a collimation element, wherein the collimation element is disposed in an optical path between the light source and the coupling input element, and the collimation element is configured to collimate the light ray emitted by the light source and emit the collimated light ray towards the coupling input element.

10. The optical system according to claim 1, wherein the second surface of the wavefront modulation element fits against the layer element.

11. The optical system according to claim 1, wherein a length at which the coupling output grating fits against the waveguide is greater than a length at which the coupling input element fits against the waveguide.

12. An aiming device, comprising a housing and an optical system;

wherein the optical system is disposed in the housing, and the optical system comprises:

a light source for emitting a light ray;

a coupling input element for receiving the light ray emitted by the light source and refracting the light ray;

a waveguide for receiving the light ray refracted by the coupling input element and propagating the light ray in the waveguide in a manner greater than a total reflection angle, wherein a total reflection cycle of the light ray transmitted in the waveguide is smaller than a width of an incident light beam;

a coupling output grating for coupling, out of the waveguide, the light ray propagated in the waveguide, wherein a light ray emitted from the waveguide is a first light wave;

a wavefront modulation element with a first surface and a second surface disposed opposite to each other, wherein the first surface of the wavefront modulation element is configured to receive the first light wave without a complete plane wavefront, and the second surface of the wavefront modulation element is configured to emit a second light wave with a complete plane wavefront obtained due to light beam shaping of the first light wave by the wavefront modulation element, wherein the first light wave comprises a plurality of segmented plane waves, at least two adjacent plane waves of the plurality of segmented plane waves partially overlap, and each of the plurality of segmented plane waves has a total wave field with a different amplitude and a different phase, and the plurality of segmented plane waves are formed by a superposition of two light beams hitting the coupling output grating; and a layer element for receiving the second light wave and presenting a target image recorded by the layer element, wherein the layer element includes a Fourier hologram, the layer element further configured to convert a Fourier spectrum light U(x) into an intensity distribution O(u) of an image observable to human eyes, a conversion formula of the conversion is as follows:

$$O(u)=|FT\{U(x)\}|^2,$$

wherein FT denotes a Fourier transform process, and || denotes the modulo operation;

the coupling input element and the coupling output grating fit against the waveguide, the wavefront modulation element comprises a first optical element configured to modulate amplitude and a second optical element configured to modulate phase, the first optical element has an amplitude transmission distribution $$t(x)=\frac{\alpha}{A(x)},$$

α denotes a constant, A(x) denotes an amplitude distribution of the first light wave at position x, the second optical element has a phase distribution $\varphi(x)=\beta(x)+2m\pi-\phi(x)$, m is an integer, β(x) denotes a proportional function, and ϕ(x) denotes a phase distribution of the first light wave at position x, the β(x) satisfies a formula $\beta(x)=k\sin(\gamma)x$, where k denotes a wavenumber of the first light wave, and γ denotes an incident angle to the layer element.

13. The aiming device according to claim 12, wherein the first light wave is $W(x)=\Sigma W_n(x)=A(x)\exp[i\varphi(x)]$, wherein $W_n(x)$ denotes a light wave of an $n^{th}$ segment at position x, A(x) denotes the amplitude distribution of the first light wave at position x, and φ(x) denotes the phase distribution of the first light wave at position x; the second light wave is $V(x)=\alpha\exp[i\beta(x)]$, wherein α denotes the constant, and β(x) denotes the proportional function; and the wavefront modulation element has a complex amplitude transmittance $T(x)=t(x)\exp[i\varphi(x)]$.

14. The aiming device according to claim 13, wherein the wavefront modulation element is processed by a holographic manufacturing process.

15. The aiming device according to claim 12, wherein the first optical element fits against the second optical element, the first surface is located on a side of the first optical element facing away from the second optical element or on a side of the second optical element facing away from the first optical element, and the second surface is located on the side of the second optical element facing away from the first optical element or on the side of the first optical element facing away from the second optical element.

16. The optical system according to claim 15, wherein the wavefront modulation element is processed by a holographic manufacturing process.

17. The optical system according to claim 9, wherein the coupling input element fits with a first side of the waveguide, the coupling output grating fits with a second side of the waveguide, the first side and the second side are not parallel;

the light source and the collimation element are aligned along the optical axis pointing toward the first side, configured to inject light into the waveguide from a first side.

18. The optical system of claim 6, wherein a caliber of a surface light beam of the coupling output grating is larger than an input caliber of the surface light beam of the coupling input element.

19. The optical system of claim 1, wherein the first surface of the wavefront modulation element has a predetermined spacing from the waveguide.

* * * * *